United States Patent
Lim et al.

(10) Patent No.: US 9,461,789 B2
(45) Date of Patent: Oct. 4, 2016

(54) METHOD FOR CONTROLLING INTERFERENCE IN WIRELESS COMMUNICATION SYSTEM AND APPARATUS THEREFOR

(71) Applicant: LG Electronics Inc., Seoul (KR)

(72) Inventors: Jaewon Lim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/402,174

(22) PCT Filed: May 16, 2013

(86) PCT No.: PCT/KR2013/004355
§ 371 (c)(1),
(2) Date: Nov. 19, 2014

(87) PCT Pub. No.: WO2013/183869
PCT Pub. Date: Dec. 12, 2013

(65) Prior Publication Data
US 2015/0124733 A1    May 7, 2015

Related U.S. Application Data

(60) Provisional application No. 61/657,040, filed on Jun. 8, 2012.

(51) Int. Cl.
*H04W 4/00*    (2009.01)
*H04L 5/00*    (2006.01)
(Continued)

(52) U.S. Cl.
CPC ............ *H04L 5/0032* (2013.01); *H04W 16/16* (2013.01); *H04W 52/244* (2013.01)

(58) Field of Classification Search
USPC ................ 370/230, 252, 328, 329, 330, 331
See application file for complete search history.

(56) References Cited

U.S. PATENT DOCUMENTS

| | | | |
|---|---|---|---|
| 2013/0084865 A1* | 4/2013 | Agrawal | H04W 36/0083 455/436 |
| 2013/0107798 A1* | 5/2013 | Gao | H04W 72/1226 370/328 |

(Continued)

FOREIGN PATENT DOCUMENTS

| | | |
|---|---|---|
| WO | 2011/159988 A1 | 12/2011 |
| WO | 2012/060608 A2 | 5/2012 |

(Continued)

OTHER PUBLICATIONS

Fujitsu, "Signalling enhancement for the operational carrier selection", R3-120640, 3GPP TST-RAN WG3 #75 bis, Jeju, South Korea, Mar. 26-30, 2012, http://www.3gpp.org/ftp/tsg_ran/WG3_lu/TSGR3_75bis/Docs/, 3 pages.*

*Primary Examiner* — Kwang B Yao
*Assistant Examiner* — Nguyen Ngo
(74) *Attorney, Agent, or Firm* — Dentons US LLP

(57) ABSTRACT

A method for controlling interference between a plurality of pico base stations within the coverage of a macro base station in a wireless communication system, according to one embodiment of the present invention, comprises the steps of: enabling a first pico base station to transmit information on a first subset of an ABS (almost blank subframe) pattern for measuring a downlink to user equipment on the basis of the ABS pattern of a macro base station; receiving, from the user equipment, the measurement results of the downlink in the first subset; detecting, from the measurement results of the downlink, interference from a second pico base station within the coverage of the macro base station, wherein if the interference is detected, the first pico base station can transmit, to the second pico base station, a message for requesting pairing with the macro base station with respect to the ABS pattern.

6 Claims, 9 Drawing Sheets

(51) Int. Cl.
*H04W 52/24* (2009.01)
*H04W 16/16* (2009.01)

(56) References Cited

U.S. PATENT DOCUMENTS

| | | | | |
|---|---|---|---|---|
| 2013/0229971 | A1* | 9/2013 | Siomina | H04W 24/10 370/312 |
| 2013/0322235 | A1* | 12/2013 | Khoryaev | H04W 24/10 370/229 |
| 2013/0343214 | A1* | 12/2013 | Yamamoto | H04W 72/085 370/252 |
| 2014/0094181 | A1* | 4/2014 | Kakinada | H04W 16/08 455/446 |
| 2014/0177558 | A1* | 6/2014 | Bagheri | H04L 5/0058 370/329 |
| 2015/0131553 | A1* | 5/2015 | Centonza | H04L 5/0032 370/329 |

FOREIGN PATENT DOCUMENTS

| | | |
|---|---|---|
| WO | 2012/060638 A2 | 5/2012 |
| WO | 2012/060656 A2 | 5/2012 |

\* cited by examiner

FIG. 7
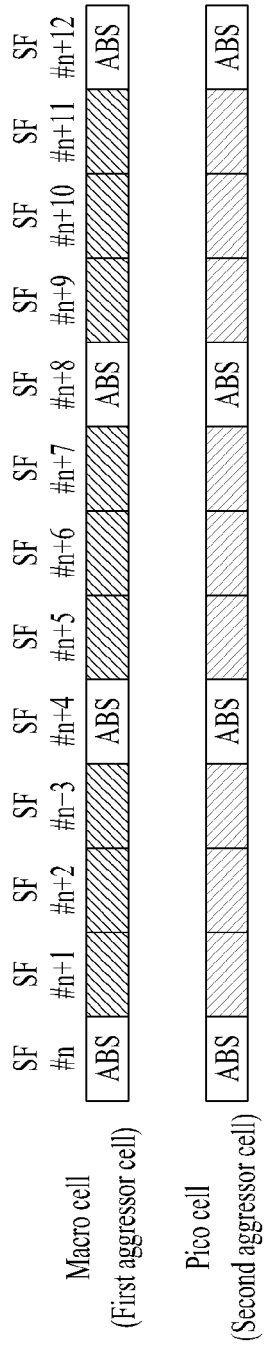
(a)
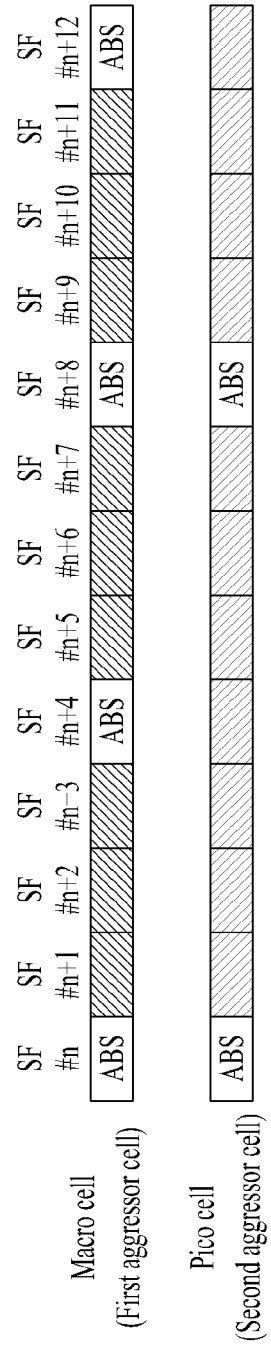
(b)

METHOD FOR CONTROLLING INTERFERENCE IN WIRELESS COMMUNICATION SYSTEM AND APPARATUS THEREFOR

This Application is a 35 U.S.C. §371 National Stage entry of International Application No. PCT/KR2013/004355, filed May 16, 2012, which claims benefit of Provisional Application No. 61/657,040 filed Jun. 19, 2013, both of which are incorporated by reference in their entirety herein.

TECHNICAL FIELD

The present invention relates to a method for controlling interference in a wireless communication system, and an apparatus therefor.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication using a plurality of nodes each operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may be conducted with uniform quality irrespective of the locations of UEs within a cell. Furthermore, the multi-node system boasts of reduced signal loss during transmission because a BS(s) or BSC(s) connected to a plurality of nodes cooperate in data transmission and reception. If nodes located apart from each other by a predetermined distance or more conduct cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

However, if cooperative scheduling is not conducted between a plurality of nodes in the multi-node system, the advantages of the multi-node system can be weakened due to interference between the plurality of nodes. Specifically, these problems can become more serious in a wireless communication system in which small cells such as pico cells or femto cells are distributed. Accordingly, there is a need for developing a method for controlling interference between the cells in the small-cell environment.

DISCLOSURE

Technical Problem

An object of the present invention devised to solve the problem lies in a method for mitigating interference between small cells (e.g., pico cells or femto cells) in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for controlling interference between a plurality of pico evolved Node Bs (eNBs) within coverage of a macro eNB by a first pico eNB in a wireless communication system, the method including transmitting information about a first subset of an Almost Blank Subframe (ABS) pattern for Downlink (DL) measurement to a User Equipment (UE) based on the ABS pattern of the macro eNB, receiving a result of the DL measurement in the first subset from the UE, detecting interference from a second pico eNB within the coverage of the macro eNB based on the result of the DL measurement, and transmitting a message for requesting pairing with the macro eNB in relation to the ABS pattern to the second pico eNB if the interference is detected.

Preferably, the paring with the macro eNB in relation to the ABS pattern may be that the second pico eNB uses a transmission pattern which is the same as the ABS pattern or a transmission pattern corresponding to a second subset of the ABS pattern.

Preferably, the message for requesting paring may include identifier information of the macro eNB and DL ABS status information indicating a rate of use of the ABS pattern by the first pico eNB.

Preferably, the method may further include receiving information about the second subset of the ABS pattern from the second pico eNB.

Preferably, the method may further include receiving an indicator indicating that the transmission pattern which is the same as the ABS pattern is used, from the second pico eNB.

Preferably, the method may further include scheduling the UE in the second subset of the ABS pattern or a part of the second subset.

In another aspect of the present invention, provided herein is a pico evolved Node B (eNB) located within coverage of a macro eNB in a wireless communication system, the pico eNB including a Radio Frequency (RF) unit and a processor configured to control the RF unit, wherein the processor is configured to transmit information about a first subset of an Almost Blank Subframe (ABS) pattern for Downlink (DL) measurement to a User Equipment (UE) based on the ABS pattern of the macro eNB, to receive a result of the DL measurement in the first subset from the UE, to detect interference from a second pico eNB within the coverage of the macro eNB based on the result of the DL measurement, and to transmit a message for requesting pairing with the macro eNB in relation to the ABS pattern to the second pico eNB if the interference is detected.

Preferably, the paring with the macro eNB in relation to the ABS pattern may be that the second pico eNB uses a transmission pattern which is the same as the ABS pattern or a transmission pattern corresponding to a second subset of the ABS pattern.

Preferably, the message for requesting paring may include identifier information of the macro eNB and DL ABS status information indicating a rate of use of the ABS pattern by the pico eNB.

Preferably, the processor may be further configured to receive information about the second subset of the ABS pattern from the second pico eNB.

Preferably, the processor may be further configured to receive an indicator indicating that the transmission pattern which is the same as the ABS pattern is used, from the second pico eNB.

Preferably, the processor may be further configured to schedule the UE in the second subset of the ABS pattern or a part of the second subset.

It is to be understood that both the foregoing general description and the following detailed description of the present invention are exemplary and explanatory and are intended to provide further explanation of the invention as claimed.

Advantageous Effects

According to an embodiment of the present invention, interference between small cells (e.g., pico cells or femto cells) may be mitigated in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 7 illustrates FIGS. 7a and b illustrate exemplary ABS patterns according to an embodiment of the present invention;

BEST MODE

Figure 1:
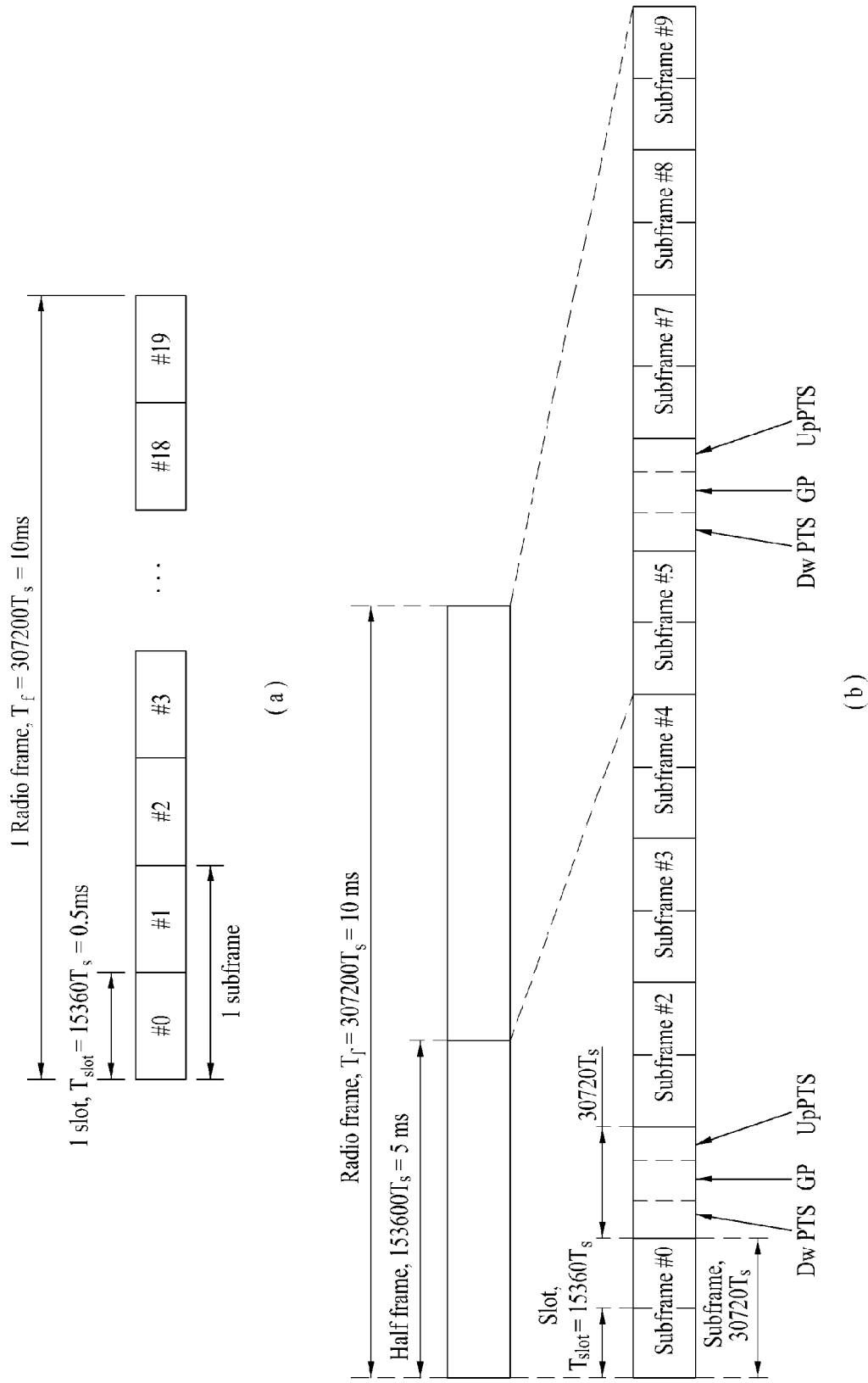
FIG. 1 illustrates FIGS. 1a and b illustrate an exemplary radio frame structure in a wireless communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems as described below are applicable to various wireless multiple access systems. For the convenience of description, the following description is given of the present invention in the context of a $3^{rd}$ Generation Partnership Project (3GPP) Long Term Evolution (LTE)/LTE-Advanced (LTE-A) system, which should not be construed as limiting the present invention. For example, although the following description is given in the context of the 3GPP LTE/LTE-A system as an exemplary mobile communication system, the same thing applies to other mobile communication systems except for features inherent to the 3GPP LTE/LTE-A system.

In some instances, known structures and devices are omitted or are shown in block diagram form, focusing on important features of the structures and devices, so as not to obscure the concept of the invention Like reference numerals denote the same components throughout the specification.

In the present invention, User Equipments (UEs) may be fixed or mobile, including various devices that transmit and receive user data and/or various types of information to and from a Base Station (BS) by communication. The term UE may be replaced with terminal equipment, Mobile Station (MS), Mobile Terminal (MT), User Terminal (UT), Subscriber Station (SS), wireless device, Personal Digital Assistant (PDA), wireless modem, handheld device, etc. A BS generally refers to a fixed station communicating with a UE and/or another BS and exchanges data and control information with a UE and another BS. The term BS may be replaced with Advanced BS (ABS), Node B (NB), evolved Node B (eNB or eNode B), Base Transceiver System (BTS), Access Point (AP), Processing Server (PS), etc.

In the present invention, a Physical Downlink Control Channel (PDCCH)/Physical Control Format Indicator Channel (PCFICH)/Physical Hybrid automatic repeat and request Indicator Channel (PHICH)/Physical Downlink Shared Channel (PDSCH) is a set of time-frequency resources or Resource Elements (REs) that deliver Downlink Control Information (DCI)/Control Format Indicator (CFI)/Downlink ACKnowledgment/Negative ACKnowledgment (DL ACK/NACK)/DL data. A Physical Uplink Control Channel (PUCCH)/Physical Uplink Shared Channel (PUSCH) is a set of time-frequency resources or REs that deliver Uplink Control Information (UCI)/Uplink (UL) data. Particularly, time-frequency resources or REs allocated to or belonging to the PDCCH/PCFICH/PHICH/PDSCH/PUCCH/PUSCH are referred to as PDCCH/PCFICH/PHICH/PDSCH/PUCCH/PUSCH resources or REs in the present invention. Thus, when it is said that a UE transmits a PUCCH/PUSCH, this means that the UE transmits UCI/UL data/random access signal on the PUCCH/PUSCH. Also, when it is said that a BS transmits a PDCCH/PCFICH/PHICH/PDSCH, this means that the BS transmits DL data/control information on the PDCCH/PCFICH/PHICH/PDSCH.

In the present invention, Cell-specific Reference Signal (CRS)/Demodulation Reference Signal (DMRS)/Channel State Information Reference Signal (CSI-RS) time-frequency resources (or REs) are time-frequency resources (or REs) that may be allocated to or are available to a CRS/DMRS/CSI-RS or time-frequency resources (or REs) carrying a CRS/DMRS/CSI-RS. A subcarrier including a CRS/DMRS/CSI-RS is referred to as a CRS/DMRS/CSI-RS subcarrier and an Orthogonal Frequency Division Multiplexing (OFDM) symbol carrying a CRS/DMRS/CSI-RS is referred to as a CRS/DMRS/CSI-RS symbol. Also, Sounding Reference Signal (SRS) time-frequency resources (or REs) are time-frequency resources (REs) carrying an SRS for a BS to use in measuring the state of a UL channel established between a UE and the BS. An RS is a predefined signal having a special waveform, known to both a BS and a UE. An RS is also called a pilot signal.

In the present invention, a cell is defined as a predetermined geographical area in which a BS, a node(s), or an antenna port(s) provides a communication service. Therefore, communication with a specific cell amounts to communication with a BS, a node, or an antenna port that provides a communication service to the specific cell. A DL/UL signal in a specific cell means a DL/UL signal from/to a BS, a node, or an antenna port that provides a communication service to the specific cell. A channel state/quality of a specific cell refers to a channel state/quality of a channel or a communication link established between a UE and a BS, a node, or an antenna port that provides a communication service to the specific cell.

FIG. 1 illustrates an exemplary structure of a radio frame in a wireless communication system. Specifically, FIG. 1(a) illustrates an exemplary radio frame structure for Frequency Division Duplex (FDD) mode in a 3GPP LTE/LTE-A system and FIG. 1(b) illustrates an exemplary radio frame structure for Time Division Duplex (TDD) mode in the 3GPP LTE/LTE-A system.

Referring to FIG. 1, a radio frame is 10 ms (307,200 $T_S$) in duration in the 3GPP LTE/LTE-A system. The radio frame is divided into 10 equal-sized subframes which may be numbered, respectively. $T_S$ represents a sampling time and is given as $T_S=1/(2048 \times 15 \text{ kHz})$. Each subframe is 1 ms long and further divided into two slots. The 20 slots of a radio frame may be numbered sequentially from 0 to 19. Each slot is 0.5 ms long/A unit time in which data is transmitted is defined as Transmission Time Interval (TTI). Time resources may be identified by a radio frame number (or a radio frame index), a subframe number (or a subframe index), a slot number (or a slot index), etc.

A different radio frame may be configured according to a duplex mode. For example, since DL transmission and UL transmission are distinguished from each other by frequency, a radio frame includes only DL subframes or UL subframes in a specific frequency band that operates in a specific carrier frequency in the FDD mode. In contrast, DL transmission and UL transmission are distinguished from each other by time in the TDD mode. Accordingly, a TDD radio frame includes both DL and UL subframes in a specific frequency band that operates in a specific carrier frequency.

Table 1 lists DL-UL configurations for subframes in a radio frame in the TDD mode.

TABLE 1

| DL-UL config- uration | Downlink- to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents DL subframe, U represents UL subframe, and S represent special subframe. A special subframe includes three fields, Downlink Pilot Time Slot (DwPTS), Guard Period (GP), and Uplink Pilot Time Slot (UpPTS). The DwPTS is a time interval reserved for DL transmission and the UpPTS is a time interval reserved for UL transmission.

Figure 2:
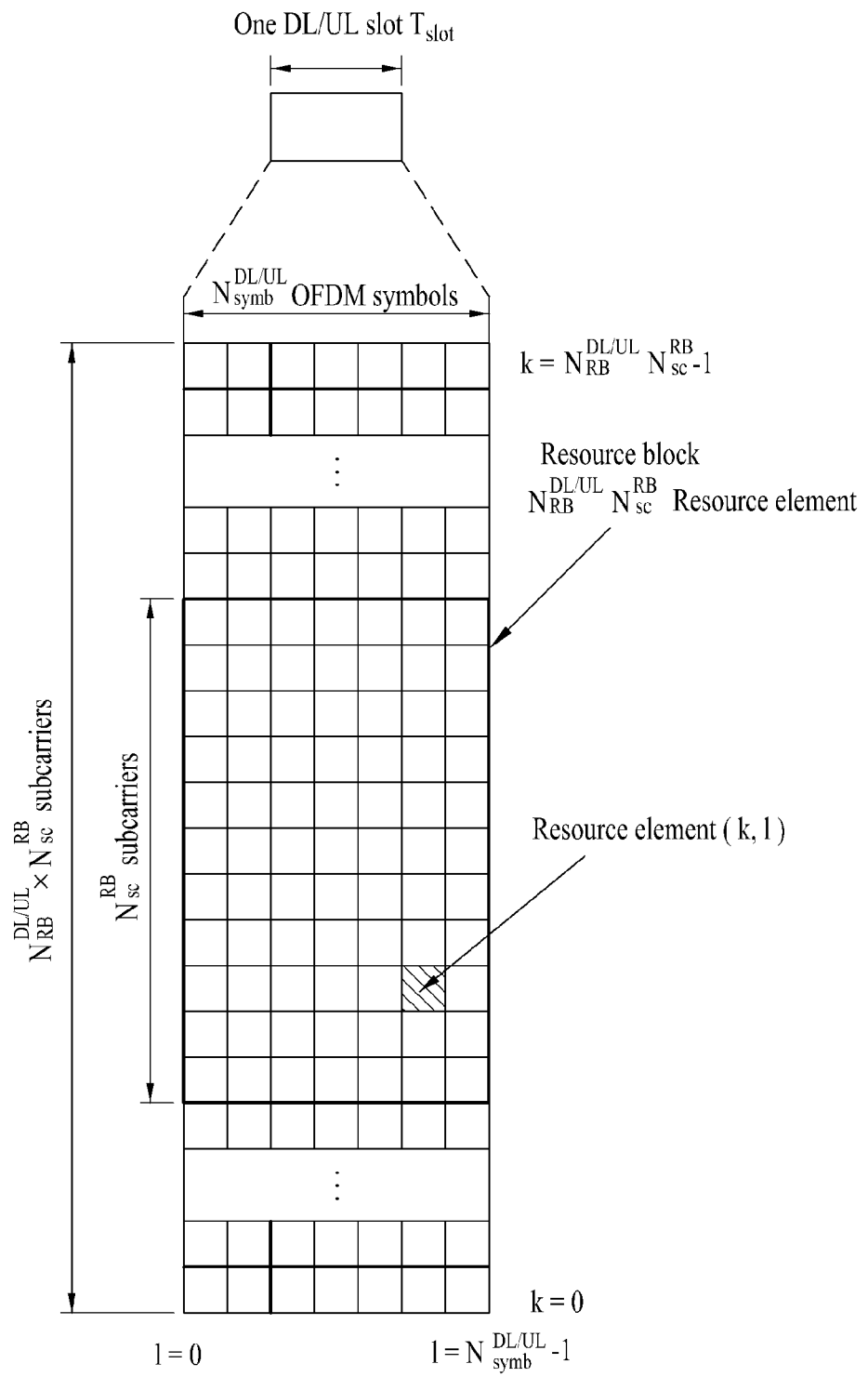
FIG. 2 illustrates an exemplary structure of a Downlink/Uplink (DL/UL) slot in a wireless communication system.

FIG. 2 illustrates an exemplary structure of a DL/UL slot in a wireless communication system. Specifically, FIG. 2 illustrates the structure of a resource grid in the 3GPP LTE/LTE-A system. There is one resource grid per antenna port.

A slot includes a plurality of OFDM symbols in the time domain by a plurality of Resource Blocks (RBs) in the frequency domain. An OFDM symbol means one symbol period. Referring to FIG. 2, a signal transmitted in each slot may be represented as a resource grid including $N^{DL/DL}_{symb}$ OFDM symbols by $N^{DL/UL}_{RB} \times N^{RB}_{SC}$ subcarriers. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on a DL transmission bandwidth and a UL transmission bandwidth, respectively. $N^{DL}_{symb}$ represents the number of OFDM symbols in the DL slot and $N^{UL}_{symb}$ represents the number of OFDM symbols in the UL slot. $N^{RB}_{SC}$ represents the number of subcarriers in one RB.

An OFDM symbol may be referred to as an OFDM symbol, an SC-FDMA symbol, etc. according to multiple access schemes. The number of OFDM symbols included in one slot may vary depending on a channel bandwidth and a Cyclic Prefix (CP) length. For example, one slot includes 7 OFDM symbols in the case of normal CP, whereas one slot includes 6 OFDM symbols in the case of extended CP. While one subframe is shown in FIG. 2 as including 7 OFDM symbols in each slot for the convenience of description, the embodiments of the present invention are applicable to a subframe including a different number of OFDM symbols. Referring to FIG. 2, each OFDM symbol includes $N^{DL/UL}_{RB} \times N^{RB}_{SC}$ subcarriers in the frequency domain. Subcarriers may be categorized into data subcarrier for data transmission, RS subcarrier for RS transmission, and null subcarrier for a guard band and a Direct Current (DC) component. The null subcarrier for the DC component is an unused subcarrier mapped to a carrier frequency f0 during OFDM signal generation or frequency upconversion. The carrier frequency is also called a center frequency.

An RB is defined as $N^{DL/DL}_{symb}$ (e.g., 7) consecutive OFDM symbols in the time domain by $N^{RB}_{SC}$ (e.g., 12) consecutive subcarriers in the frequency domain. For reference, a resource including one OFDM symbol by one subcarrier is called an RE or a tone. Therefore, one RB includes $N^{DL/DL}_{symb} \times N^{RB}_{SC}$ REs. Each RE of a resource grid may be uniquely identified by an index pair (k, 1) in a slot. Herein, k represents an index ranging from 0 to $N^{DL/DL}_{RB} \times N^{RB}_{SC}-1$ in the frequency domain and 1 represents an index ranging from 0 to $N^{DL/UL}_{symb}-1$ in the time domain.

Two RBs, each located in one of the two slots of a subframe and occupying the same $N^{RB}_{SC}$ consecutive subcarriers in the subframe are called a Physical Resource Block (PRB) pair. The two RBs of a PRB pair have the same PRB number (or PRB index). A Virtual RB (VRB) is a logical resource allocation unit, which is introduced for resource allocation. A VRB is equal to a PRB in size. Two types of VRBs are defined, Localized VRB (LVRB) and Distributed VRB (DVRB) according to how VRBs are mapped to PRBs. LVRBs are mapped directly to PRBs and thus VRB numbers (or VRB indexes) are PRB numbers. That is, nPRB=nVRB. The LVRBs are numbered from 0 to NDLVRB-1 and NDLVRB=NDLRB. Therefore, according to the localized mapping, VRBs having the same VRB number are mapped to PRBs having the same PRB number in the first and second slots of a subframe. On the contrary, DVRBs are mapped to PRBs after interleaving. Accordingly, DVRBs having the same VRB number may be mapped to PRBs having different PRB numbers in the first and second slots of a subframe. Two PRBs having the same VRB number, each in one of the two slots of a subframe, is called a VRB pair.

Figure 3:
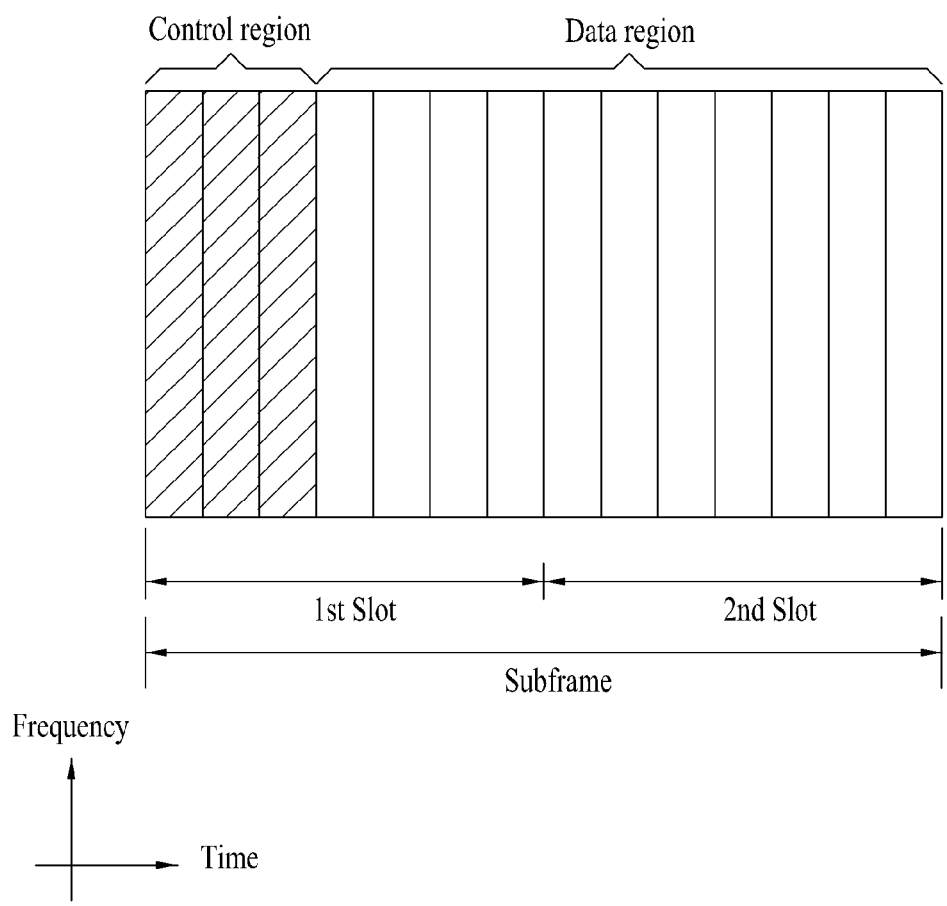
FIG. 3 illustrates an exemplary structure of a DL subframe in a $3^{rd}$ Generation Partnership project (3GPP) Long Term Evolution (LTE)/LTE-Advanced (LTE-A) system.

FIG. 3 illustrates the structure of a DL subframe in the 3GPP LTE/LTE-A system.

A DL subframe is divided into a control region and a data region in the time domain. Referring to FIG. 3, up to 3 (or 4) OFDM symbols at the start of the first slot of a DL subframe are used as a control region to which control channels are allocated. Hereinafter, a resource area available for PDCCH transmission in a DL subframe is referred to as a PDCCH region. The other OFDM symbols of the DL subframe except for the OFDM symbol(s) of the control region are used as a data region to which a PDSCH is allocated. Hereinafter, a resource area available for PDSCH transmission in a DL subframe is referred to as a PDSCH region. DL control channels defined for the 3GPP LTE system include PCFICH, PDCCH, PHICH, etc. The PCFICH is transmitted in the first OFDM symbol of a subframe, carrying information about the number of OFDM symbols used for transmission of control channels in the subframe. The PHICH delivers a Hybrid Automatic Repeat and reQuest (HARQ) ACK/NACK signal as a response to a UL transmission.

Control information delivered on the PDCCH is called DCI. The DCI transports resource allocation information and other control information for a UE or a UE group. For example, the DCI includes information about resource allocation and a transport format for a Downlink Shared Channel (DL-SCH), information about resource allocation and a transport format for an Uplink Shared Channel (UL-SCH), paging information on a Paging Channel (PCH), system information on the DL-SCH, information about resource allocation for a higher-layer control message such as a random access response transmitted on the PDSCH, a set of transmission power control commands for individual UEs of a UE group, a transmission power control command, Voice Over Internet Protocol (VoIP) activation indication information, etc. DCI delivered on a PDCCH has a different size and usage depending on its DCI format. The size of the DCI may vary with a coding rate.

A plurality of PDCCHs may be transmitted in the PDCCH region of a DL subframe. A UE may monitor a plurality of PDCCHs. A BS determines a DCI format according to DCI to be transmitted to a UE and adds a Cyclic Redundancy Check (CRC) to the DCI. The CRC is masked (or scrambled) by an Identifier (ID) (e.g., Radio Network Temporary Identifier (RNTI)) according to the owner or usage of a PDCCH. If the PDCCH is destined for a specific UE, the CRC may be masked by a Cell RNTI (C-RNTI) of the UE. If the PDCCH is for a paging message, the CRC of the PDCCH may be masked by a Paging RNTI (P-RNTI). If the PDCCH carries system information (particularly, a System Information Block (SIB)), its CRC may be masked by a System Information RNTI (SI-RNTI). If the PDCCH is for a random access response, the CRC of the PDCCH may be masked by a Random Access RNTI (RA-RNTI). CRC masking (or scrambling) includes, for example, XOR-operation of a CRC and an RNTI at a bit level.

A PDCCH is transmitted in an aggregate of one or more consecutive Control Channel Elements (CCEs). A CCE is a logical allocation unit used to provide a coding rate to the PDCCH based on a radio channel state. A CCE includes a plurality of Resource Element groups (REGs). For example, one CCE includes 9 REGs, each REG having 4 REs. 4 Quadrature Phase Shift Keying (QPSK) symbols are mapped to each REG. An RE occupied by an RS is excluded from an REG. Therefore, the number of REGs in a given OFDM symbol varies depending on the presence or absence of an RS. The concept of REG is also applied to other DL control channels (i.e. PCFICH and PHICH). A DCI format and the number of DCI bits are determined according to the number of CCEs.

CCEs are numbered and used consecutively. To simplify a decoding process, a PDCCH configured in a format including n CCEs may start only in a CCE having a number being a multiple of n. A BS determines the number of CCEs, that is, a CCE aggregation level used for transmission of a specific PDCCH according to a channel state. For example, one CCE may be sufficient for a PDCCH directed to a UE having a good DL channel (e.g., a UE near to the BS). However, 8 CCEs may be required for a PDCCH directed to a UE having a poor channel (e.g., a UE at a cell edge) in order to ensure robustness.

Figure 4:
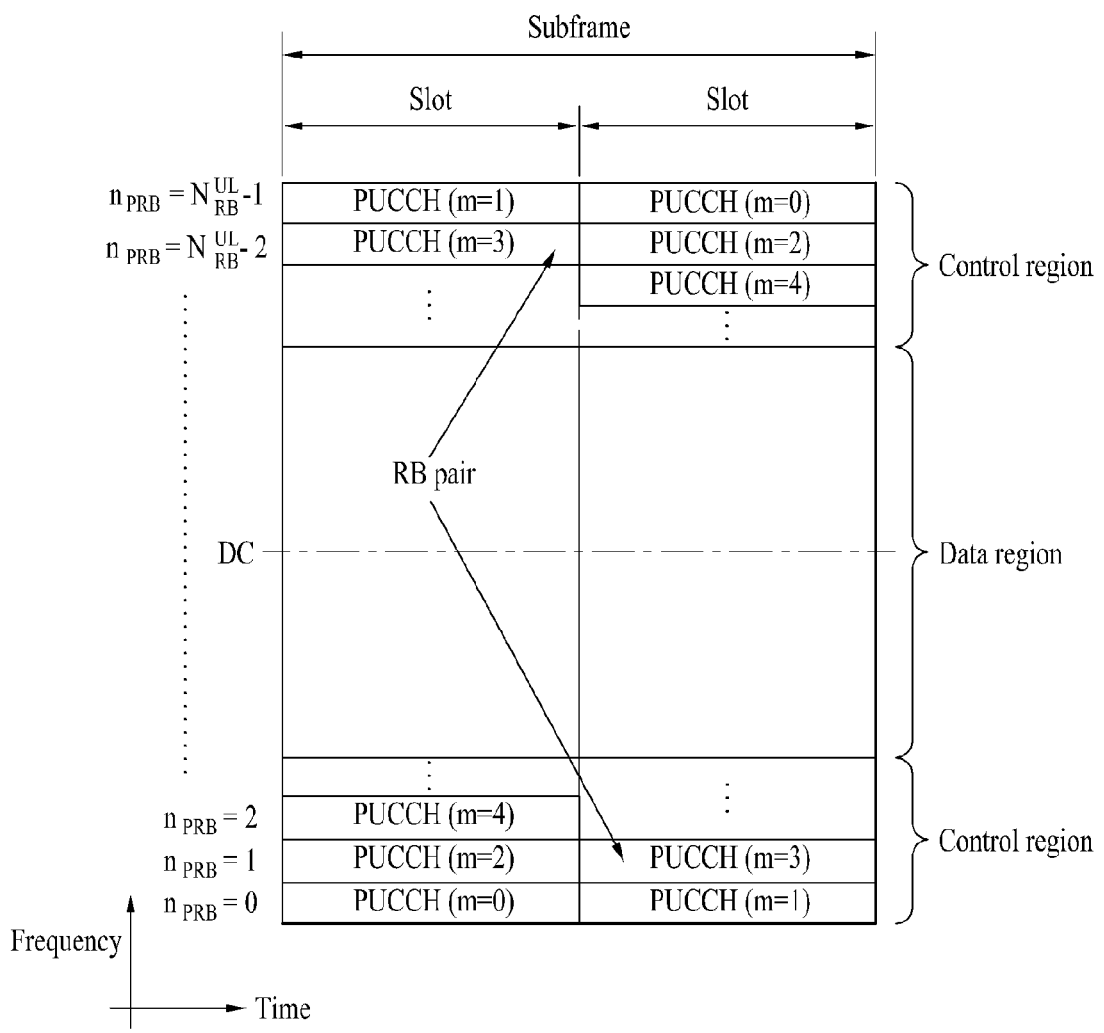
FIG. 4 illustrates an exemplary structure of a UL subframe in the 3GPP LTE/LTE-A system.

FIG. 4 illustrates an exemplary structure of a UL subframe in the 3GPP LTE/LTE-A system.

Referring to FIG. 4, a UL subframe may be divided into a control region and a data region in the frequency domain. One or more PUCCHs carrying UCI may be allocated to the control region and one or more PUSCHs carrying user data may be allocated to the data region. The control region and the data region of the UL subframe are referred to as a PUCCH region and a PUSCH region, respectively. An SRS may also be allocated to the data region. The SRS is transmitted in the last OFDM symbol of the UL subframe in the time domain and in a data transmission band, that is, the data region of the UL subframe in the frequency domain. SRSs that a plurality of UEs transmit in the last OFDM symbol of the same subframe may be distinguished from one another by frequency positions/sequences.

If a UE adopts SC-FDMA for UL transmission, the UE may not transmit a PUCCH and a PUSCH simultaneously on one carrier in a 3GPP LTE release 8 or release 9 system in order to maintain a single carrier property. In a 3GPP LTE release 10 system, a higher layer may indicate whether simultaneous transmission of a PUCCH and a PUSCH is supported.

In the UL subframe, subcarriers remote from a DC subcarrier are used as the control region. In other words, subcarriers at both ends of a UL transmission bandwidth are allocated for transmission of UCI. The DC subcarrier is a component unused for signal transmission and mapped to a carrier frequency f0 during frequency upconversion. A PUCCH for a UE is allocated to an RB pair belonging to resources operated in a carrier frequency in a subframe and the RBs of the RB pair occupy different subcarriers in the two slots of the subframe. It is said that an RB pair allocated to a PUCCH frequency-hops over a slot boundary. If frequency hopping is disabled, the RB pair occupies the same subcarriers.

The size and usage of UCI delivered on a PUCCH are different according to the format of the PUCCH. The size of the UCI may vary with a coding rate. For example, the following PUCCH formats may be defined.

TABLE 2

| PUCCH format | Modulation scheme | Number of bits per subframe, $M_{bit}$ | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codewords |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, a PUCCH format 1 series and a PUCCH format 3 series are mainly used to transmit ACK/NACK information, whereas a PUCCH format 2 series is mainly used to carry Channel State Information (CSI) such as a Channel Quality Indicator (CQI)/Precoding Matrix Index (PMI)/Rank Indicator (RI).

Currently, 3GPP LTE is working on standardization of a transmission technique based on a predetermined time pattern to mitigate interference between adjacent Transmission Points (TPs) under the issue of Almost Blank Subframe (ABS). In the ABS scheme, since an aggressor cell which can cause interference in communication of neighboring cells preliminarily transmits a transmission pattern thereof, i.e., an ABS pattern, to neighboring victim cells which can receive interference from the aggressor cell, and the victim cells of the aggressor cell actively use subframes configured as ABSs by the aggressor cell to communicate with UEs connected to the victim cells, interference from the aggressor cell may be mitigated. In addition, the cell search performance and the cell maintenance performance of the UEs connected to the victim cells for communication may be improved.

A detailed description is now given of ABS.

ABS-related signaling via an X2 interface used for communication between eNBs is now described in detail. To increase the utilization of ABS, an eNB configures restricted measurement for a UE and transmits two different ABS-based measurement sets to the UE. That is, an eNB having received an ABS pattern of a neighboring cell, more specifically, an aggressor cell via an X2 interface configures measurement sets to a UE connected to the eNB based on the ABS pattern of the aggressor cell. In a legacy 3GPP LTE system, a UE should measure CRSs in all subframes to select an MCS, an RI, and a PMI. However, if a neighboring cell configures ABSs and an aggressor cell does not transmit any DL signal or transmits a DL signal with reduced power in subframes configured as the ABSs, interference varies according to an ABS pattern and thus the UE should perform subframe-specific measurement. To this end, an eNB indicates measurement of a specific subframe to a specific UE and the UE performs subframe-specific measurement. This is called restricted measurement. If a specific cell configures some of total subframes as ABSs to support restricted measurement, the cell should transmit information specifying the configured ABSs via an inter-eNB X2 interface. ABS signaling defined by 3GPP LTE-A largely includes ABS information and ABS status.

ABS information is shown in Table 3. ABS Pattern Info indicates subframes to be used as ABSs in the form of a bitmap. ABS Pattern Info is configured as a bitmap of 40 bits in FDD mode, and configured as a bitmap of up to 70 bits in TDD mode while the number of bits varies according to UL-DL configurations. For example, in the FDD mode, 40 bits indicate 40 subframes, and a bit value of 1 indicates an ABS while a bit value of 0 indicates a non-ABS. When restricted measurement is configured to a UE, the number of CRS antenna ports of a corresponding cell is signaled to the UE for CRS measurement. Measurement Subset is a subset of ABS Pattern Info Like ABS Pattern Info, Measurement Subset is a bitmap of 40 bits in the FDD mode and is a bitmap of up to 70 bits in the TDD mode, which is a sort of recommended restricted measurement set for configuring restricted measurement to a UE.

TABLE 3

| IE/Group Name | Presence | Range | IE type and reference | Semantics description |
|---|---|---|---|---|
| CHOICE ABS Information | M | — | — | |
| >FDD | | | — | |
| >>ABS Pattern Info | M | | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, . . .) | P (number of antenna ports for cell-specific reference signals) defined in TS 36.211 [10] |
| >>Measurement Subset | M | | BIT STRING (SIZE(40)) | Indicates a subset of the ABS Pattern Info above, and is used to configure specific measurements towards the UE. |
| >TDD | | | — | |
| >>ABS Pattern Info | M | | BIT STRING (1 . . . 70, . . .) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in TS 36.211 [10]. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . .) | P (number of antenna ports for cell-specific reference signals) defined in TS 36.211 [10] |
| >>Measurement Subset | M | | BIT STRING (1 . . . 70, . . .) | Indicates a subset of the ABS Pattern Info above, and is used to configure specific measurements towards the UE |
| >ABS Inactive | M | | NULL | Indicates that interference coordination by means of almost blank sub frames is not active |

Table 4 shows ABS status IE. ABS status IE is used to help an eNB to determine whether to change an ABS pattern. Usable ABS Pattern Info is a subset of ABS Pattern Info in the form of a bitmap, which indicates whether subframes configured as ABSs are appropriately used for interference mitigation. DL ABS status specifies a ratio between the number of DL RBs scheduled for subframes indicated by Usable ABS Pattern Info and the number of RBs allocated to UEs to be protected through ABSs among the DL RBs, which indicates how efficiently ABSs have served their purpose in a victim cell.

TABLE 4

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of |

TABLE 4-continued

| IE/Group Name | Presence | Range | IE type and reference | Semantics description |
|---|---|---|---|---|
| | | | | resource blocks within the ABS indicated in the Usable ABS Pattern Info IE allocated by the eNB2 for UEs needing protection by ABS from inter-cell interference for DL scheduling, or allocated by the eNB2 for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each position in the bitmap represents a subframe, for which value "1" indicates 'ABS that has been designated as protected from inter-cell interference by the eNB1, and available to serve this purpose for DL scheduling in the eNB2' and value "0" is used for all other subframes. The pattern represented by the bitmap is a subset of, or the same as, the corresponding ABS Pattern Info IE conveyed in the LOAD INFORMATION message from the eNB1. |
| >TDD | | | — | — |
| >>Usable ABS Pattern Info | M | | BIT STRING (1 . . . 70) | Each position in the bitmap represents a subframe, for which value "1" indicates 'ABS that has been designated as protected from inter-cell interference by the eNB1, and available to serve this purpose for DL scheduling in the eNB2' and value "0" is used for all other subframes. The pattern represented by the bitmap is a subset of, or the same as, the corresponding ABS Pattern Info IE conveyed in the LOAD INFORMATION message from the eNB1. |

As described above, when a plurality of TPs placed in an aggressor-victim relationship in terms of interference predetermines their transmission patterns specifying transmission and reception timings thereof through mutual scheduling, a UE located at a geographical point communicable with all corresponding cells may communicate with a specific TP at an available transmission/reception time of the TP. Accordingly, the UE may communicate with the plurality of TPs by dividing transmission and reception timings thereof appropriately for the transmission patterns of the TPs. In this case, the UE may be connected to and communicate with each of the plurality of TPs of which transmission/reception timings are preconfigured not to overlap.

In the above communication scheme using ABSs, when UEs perform handover to small cells (e.g., pico cells or femto cells), cell search for the small cells and DL data transmission may be performed using radio resources of subframes configured as ABSs and thus Cell Range Extension (CRE) for extending basic coverage to a wider region may be implemented. Due to such CRE, traffic concentrated in a macro cell may be distributed to the small cells and thus load balancing may be achieved.

In this case, when a plurality of victim cells receive interference from an aggressor cell and are located adjacent to each other to cause mutual interference, although the aggressor cell operates using ABSs, the interference between the victim cells is not mitigated. Furthermore, since the victim cells will actively use subframes configured as ABSs to maintain connection with UEs connected in CRE regions of the victim cells, resource allocation to and cell search of the UEs connected in the CRE regions may be concentrated in an ABS period. As such, if the interference between the neighboring victim cells is severe, the quality of signals to be transmitted to the UEs connected to the victim cells in the CRE regions and the maintenance of cell search performance may not be easily achieved. To solve this problem, a method for controlling interference between victim cells is necessary.

Figure 5:
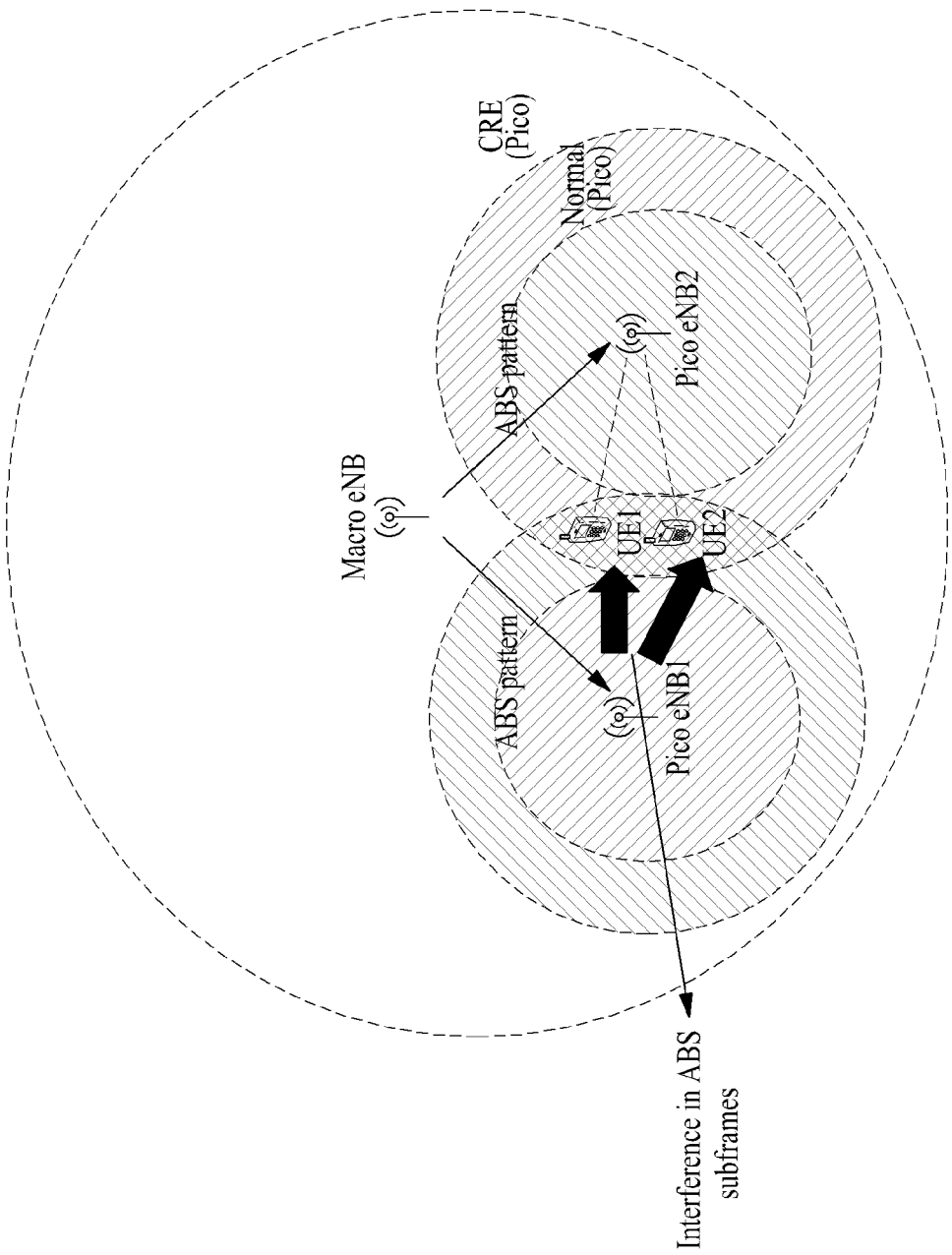
FIG. 5 illustrates a wireless communication environment according to an embodiment of the present invention.

FIG. 5 illustrates that interference can be caused between pico eNBs corresponding to victim cells even when a macro eNB corresponding to an aggressor cell performs communication using ABSs. That is, FIG. 5 shows, when the pico eNBs are located within communication coverage of the macro eNB corresponding to the aggressor cell and receive interference from the macro cell, UEs (e.g., UE1 and UE2) located in a CRE region of pico eNB2 can receive interference from pico eNB1. UE1 and UE2 connected to a serving cell (e.g., pico eNB2) can receive signals with lower intensities from pico eNB2 when connected in the CRE region of pico eNB2 compared to when connected through normal handover, and thus cannot easily maintain connection when subjected to interference from a neighboring cell such as pico eNB1. That is, although normal handover is performed depending on the intensities of signals received from two cells in a cell edge region (e.g., a region where coverage of a target cell overlaps with the coverage of a serving cell), since the CRE region is spaced apart from the target cell by a distance greater than the distance from the cell edge region to the target cell for the normal handover operation, if handover is performed in the CRE region according to a legacy cell operation, UE1 or UE2 will be vulnerable to interference from a neighboring cell such as the serving cell. In other words, if interference is received from a neighboring cell such as pico eNB1, UE1 and UE2 connected to pico eNB2 can experience difficulty in maintaining connection with pico eNB2.

To solve the above-described problem, the present invention proposes an ABS pairing scheme capable of mitigating interference caused between victim cells (e.g., pico eNB1 and pico eNB2 of FIG. 5) operating in consideration of ABS patterns of a common aggressor cell (e.g., macro eNB of FIG. 5). When interference is caused between victim cells having a common aggressor cell, the ABS pairing scheme may mitigate interference from a victim cell to UEs connected to a neighboring victim cell by operating the corresponding victim cell the same as ABS-based transmission operation of the aggressor cell, or by operating the corresponding victim cell using an ABS pattern of the victim cell in a part of subframes configured as ABSs in the ABS pattern of the aggressor cell.

In this case, the ABS patterns transmitted from the macro eNB corresponding to the aggressor cell to the pico eNBs corresponding to the victim cells are assumed as the same ABS pattern or as having a common subset ABS pattern. Furthermore, for distinguishment from a legacy aggressor cell which operates by configuring ABSs, the legacy aggressor cell (e.g., macro eNB of FIG. 5) is defined as a first aggressor cell and a victim cell (e.g., pico eNB1 of FIG. 5) which interferes with a neighboring victim cell is defined as a second aggressor cell in this specification. This second aggressor cell is defined as a cell which causes no or little reduction in performance of a whole network even when a transmission pattern thereof is configured to be the same as an ABS pattern of an aggressor cell because no UE is connected thereto in a CRE region or a rate of use of resource blocks (RBs) of ABS subframes is low.

If the transmission pattern of the second aggressor cell is configured to be the same as or to be a subset of an ABS transmission pattern of the first aggressor cell, the second aggressor cell operates the same as the ABS transmission pattern of the first aggressor cell. Accordingly, since both of the first aggressor cell and the second aggressor cell transmit no signal or transmit signals with low Tx power in an ABS period, interference from the second aggressor cell to a victim cell, e.g., pico eNB2, and causing the victim cell to experience difficulty in maintaining connection with UEs located in a CRE region may be mitigated. In addition, operation in which the second aggressor cell uses a part of or the whole ABS transmission pattern of the first aggressor cell is referred to as "ABS pairing".

Additionally, the second aggressor cell having requested to operate using an ABS pattern the same as that of the first aggressor cell may transmit DL signals only in some of ABSs of the ABS pattern of the first aggressor cell, and use the other ABSs for signal transmission and data transmission to improve the cell search performance of UEs which desire to be connected thereto in a CRE region thereof. In this case, the ABS pattern of the second aggressor cell is a subset ABS pattern of the ABS pattern of the first aggressor cell, and thus the second aggressor cell may selectively transmit information about the subset ABS pattern, which is the ABS pattern of the second aggressor cell, to a victim cell, e.g., pico eNB2, receiving interference from the second aggressor cell.

For the above-described ABS pairing operation of the second aggressor cell with ABS operation of the first aggressor cell, pico eNB2 receiving interference from the neighboring second aggressor cell may transmit an ABS pairing indication message to the second aggressor cell to request the second aggressor cell to perform transmission operation thereof the same as the ABS operation of the first aggressor cell. The ABS pairing indication message may be transmitted from pico eNB2 receiving interference from the second aggressor cell or from the macro eNB corresponding to the first aggressor cell, to the second aggressor cell.

Figure 6:
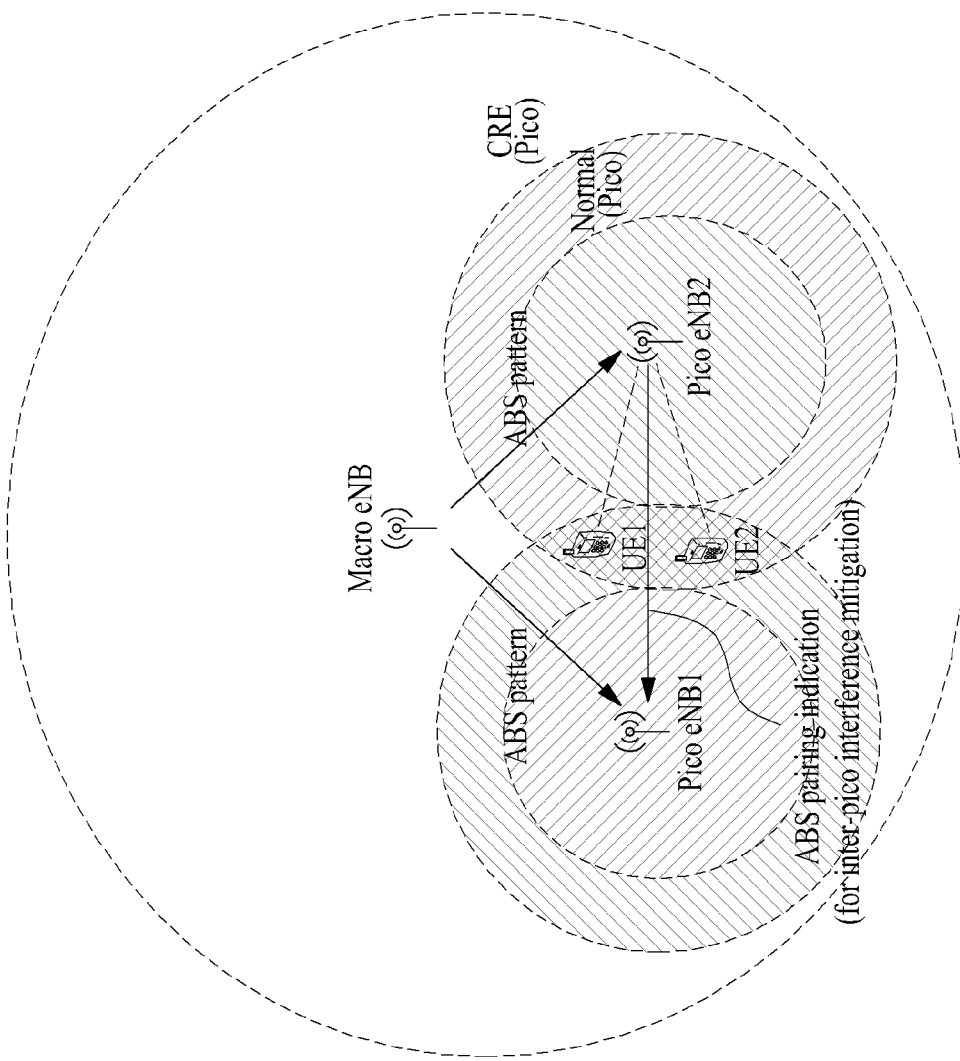
FIG. 6 illustrates a wireless communication environment according to another embodiment of the present invention.

FIG. 6 illustrates an example in which the ABS pairing indication message is transmitted from pico eNB2 to pico eNB1 corresponding to the second aggressor cell.

Pico eNB1 having received the ABS pairing indication message performs full ABS pairing for performing ABS operation using an ABS pattern the same as that of the macro eNB, or performs partial ABS pairing for performing ABS operation only in some ABSs of the ABS pattern of the macro eNB. If the partial ABS pairing operation is performed, pico eNB1 may selectively transmit subset ABS pattern information corresponding to a subset of the ABS pattern of the macro eNB applied to pico eNB 1 for the partial ABS pairing operation to pico eNB2 such that pico eNB2 can use the corresponding information to maintain connection and communication with UEs connected in a CRE region. That is, pico eNB2 may schedule the UEs (e.g., UE1 and/or UE2) to communicate with pico eNB2 in the subset of the ABS pattern.

Otherwise, if the full ABS pairing operation is performed, pico eNB1 may transmit an indication message of the full ABS pairing operation to pico eNB2. That is, in this case, since pico eNB2 has already received information about the ABS pattern from the macro eNB corresponding to the first aggressor cell, only information about whether pico eNB1 performs the full ABS pairing operation is needed.

FIG. 7(a) illustrates an example of full ABS pairing, and FIG. 7(b) illustrates an example of partial ABS pairing.

Figure 8:
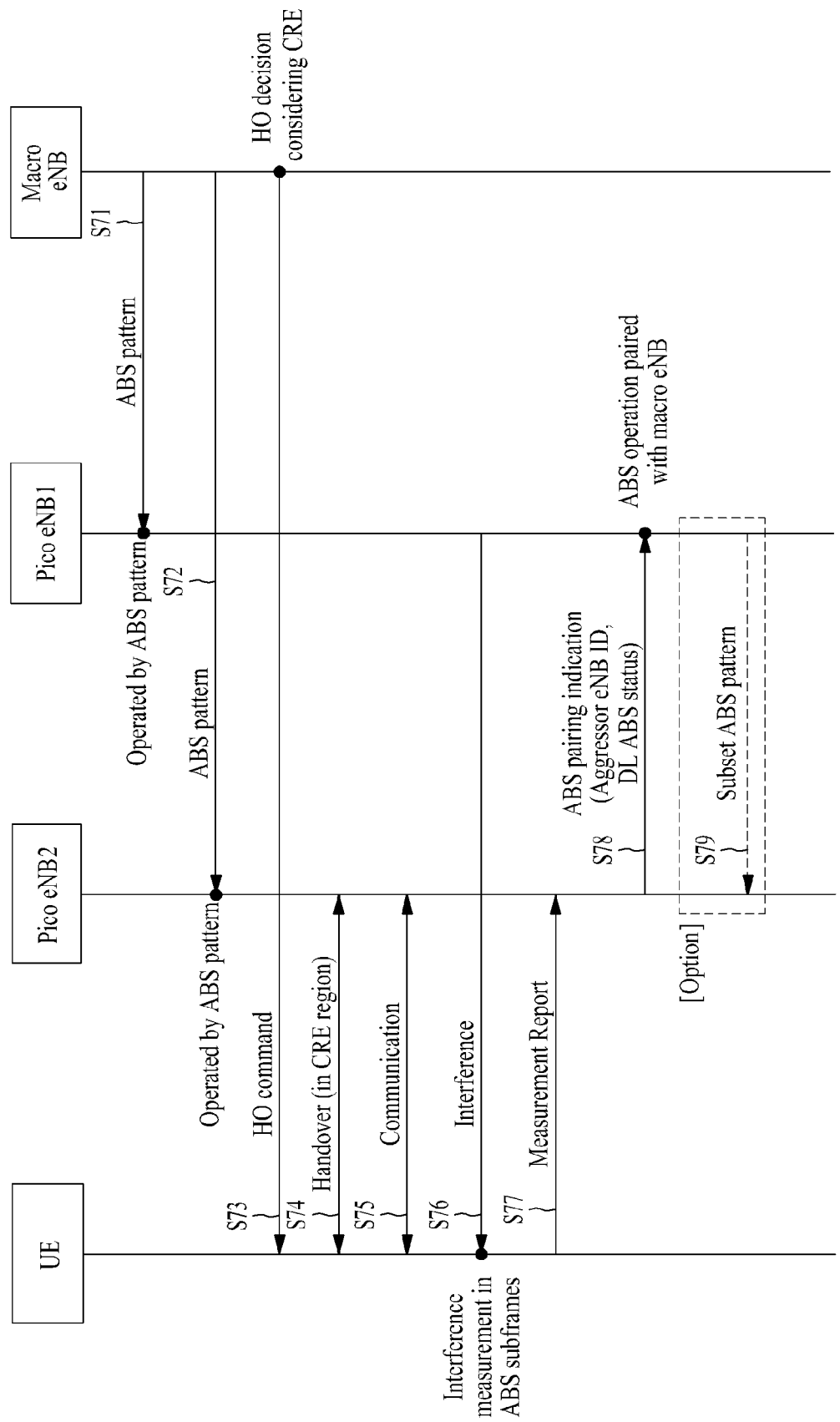
FIG. 8 illustrates a signaling and operating procedure according to an embodiment of the present invention.

FIG. 8 illustrates a signaling and operating procedure related to ABS pairing operation proposed by the present invention. The macro eNB corresponding to an aggressor cell transmits an ABS pattern thereof to pico eNB1 and pico eNB2 corresponding to victim cells (S71 and S72), and pico eNB1 and pico eNB2 use radio resources configured as ABSs of the aggressor cell to serve UEs connected in CRE regions thereof. For handover from the macro eNB to a pico cell, a UE connected to the macro eNB may receive a handover command from the macro eNB based on decision of bias-applied handover (S73). Here, the bias is a value applied when the UEs compare the intensities of signals received from a serving cell (eNB1) and a target cell (eNB2). That is, since handover in a CRE region is performed while the UEs are spaced apart from the target cell by a larger distance compared to the afore-described normal handover operation, the bias can be applied in such a manner that handover in the CRE region is determined even when the signal intensity is less than that from the target cell in normal handover. The UE may perform handover from the CRE region of pico eNB2 to pico eNB2 (S74), and communicate with pico eNB2 (S75). However, since pico eNB1 and pico eNB2 are located adjacent to each other, pico eNB1 can interfere with the UE connected to pico eNB2 in the CRE region (S76). The UE may provide a measurement report to pico eNB2 (S77) to signal that interference is caused in subframes configured as ABSs, and pico eNB2 may transmit an ABS pairing indication to neighboring pico eNB1 (S78) to request pico eNB1 to perform ABS operation using an ABS pattern the same as or partially the same as that of the aggressor cell. The ABS pairing indication may include ID information of the aggressor cell having transmitted the ABS pattern to the victim cells, and DL ABS status information indicating a rate of use of ABS resources by pico eNB2 transmitting the ABS pairing indication. Pico eNB1 having received the ABS pairing indication may perform full ABS pairing for performing ABS operation the same as that of the macro eNB, or partial ABS pairing for performing ABS operation partially the same as that of the macro eNB, in consideration of the DL ABS status information indicating the rate of use of ABS resources by pico eNB2, and the rate of use of ABS resources by pico eNB1. If the partial ABS pairing operation is performed, pico eNB 1 may selectively transmit information about a subset ABS pattern for the partial ABS pairing operation to pico eNB2 (S79) such that pico eNB2 allocates radio resources based on the subset ABS pattern to maintain connection with the UE connected in the CRE region.

Figure 9:
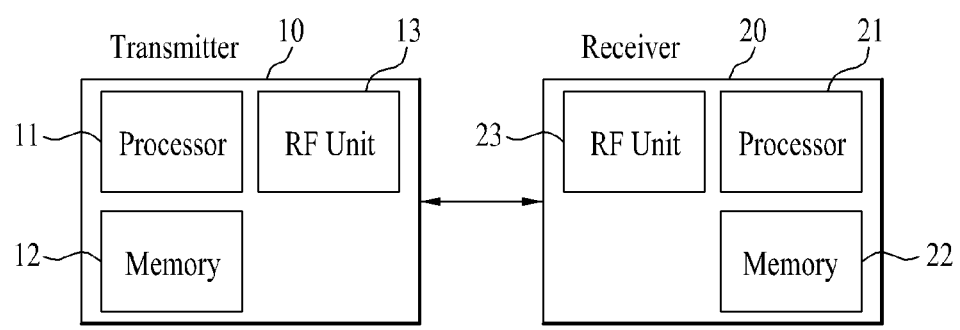
FIG. 9 is a block diagram of apparatuses for implementing an embodiment(s) of the present invention.

FIG. 9 is a block diagram of apparatuses configured to perform a UL transmission-related operation according to an embodiment of the present invention. A transmitter 10 and a receiver 20 include Radio Frequency (RF) units 13 and 23 for transmitting or receiving a wireless signal carrying information and/or data, a signal, a message, etc., memories 12 and 22 for storing various types of information related to communication in a wireless communication system, and processors 11 and 21 connected operatively to components such as the RF units 13 and 23 and the memories 12 and 22, for controlling the memories 12 and 22 and/or the RF units 13 and 23 to perform at least one of the afore-described embodiments of the present invention.

The memories 12 and 22 may temporarily store programs for processing and control of the processors 11 and 21 and input/output information. The memories 12 and 22 may be used as buffers.

The processors 11 and 21 generally provide overall control to various modules in the transmitter 10 and the receiver 20. Particularly, the processors 11 and 21 may perform various control functions to implement the present invention. The processors 11 and 21 may be called controllers, microcontrollers, microprocessors, microcomputers, etc. The processors 11 and 21 may be achieved by hardware, firmware, software, or a combination thereof. In a hardware configuration, the processors 11 and 21 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. that are configured to perform the present invention. In a firmware or software configuration, the firmware or the software may be configured to include a module, a procedure, a function, etc. that performs functions or operations of the present invention. The firmware or software configured to implement the present invention may be included in the processors 11 and 21 or may be stored in the memories 12 and 22 and executed by the processors 11 and 21.

The processor 11 of the transmitter 10 encodes and modulates a signal and/or data scheduled for transmission by the processor 11 or by a scheduler connected to the processor 11 in a predetermined coding and modulation scheme and transmits the coded and modulated signal and/or data to the RF unit 13. For example, the processor 11 converts a data stream to be transmitted to K layers by demultiplexing, channel coding, scrambling, modulation, etc. The coded data stream is called a codeword equivalent to a Transport Block (TB) which is a data block provided by a Medium Access Control (MAC) layer. A TB is encoded to a codeword and each codeword is transmitted in the form of one or more layers to a receiver. The RF unit 13 may include an oscillator, for frequency upconversion. The RF unit 13 may include $N_t$ transmission antennas ($N_t$ is a positive integer).

The receiver 20 processes a signal in reverse order of the signal processing of the transmitter 10 under the control of the processor 21. The RF unit 23 of the receiver 20 receives a wireless signal from the transmitter 10 under the control of the processor 21. The RF unit 23 may include Nr (a positive integer) reception antennas. The RF unit 23 recovers each signal received through the reception antennas to a baseband signal by frequency downconversion. The RF unit 23 may include an oscillator, for frequency downconversion. The processor 21 may recover the data transmitted by the transmitter 10 by decoding and demodulating wireless signals received through the reception antennas.

Each of the RF units 13 and 23 includes one or more antennas. The antennas transmit signals processed by the RF units 13 and 23 or receive external wireless signals and transmit the received wireless signals to the RF units 13 and 23, under the control of the processors 11 and 21. An antenna is also called an antenna port. Each antenna may correspond to one physical antenna or may include two or more physical antenna elements. The receiver 20 may not further decompose a signal transmitted by each antenna. An RS transmitted through an antenna defines the antenna from the viewpoint of the receiver 20. The RS enables the receiver 20 to perform channel estimation for the antenna irrespective of whether a channel is a single radio channel from one physical antenna or a composite channel from a plurality of physical antenna elements included in the antenna. That is, the antenna is defined so that a channel carrying a symbol from the antenna may be derived from a channel carrying another symbol from the same antenna. An RF unit supporting MIMO in which data is transmitted and received using multiple antennas may be connected to two or more antennas.

In the embodiments of the present invention, a UE or a relay operates as the transmitter 10 on UL and as the receiver 20 on DL. In the embodiments of the present invention, a BS operates as the receiver 20 on UL and as the transmitter 10 on DL. In the embodiments of the present invention, each of a UE and its peer UE operates as the transmitter 10 on UL for Device-to-Device (D2D) communication and as the receiver 20 on DL for D2D communication.

A specific structure of a UE or a BS functioning as the above receiver or transmitter may be realized so as to apply the various embodiments of the present invention described before with reference to the attached drawings independently or to apply two or more embodiments of the present invention at the same time.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention are applicable to a BS, a UE, or other devices in a wireless communication system.

The invention claimed is:

1. A method, by a second pico evolved Node B (eNB), for controlling interference between a plurality of pico eNBs within coverage of a macro eNB in a wireless communication system, the method comprising:
receiving, from the macro eNB, information of an Almost Blank Subframe (ABS) pattern used by the macro eNB performing ABS operation;
receiving, from a first pico eNB, Et message requesting that the second pica cNB perform an ABS operation using a transmission pattern which is the same as the ABS pattern or a transmission pattern corresponding to a subset of the ABS pattern; and
performing the ABS operation using the transmission pattern which is the same as the ABS pattern or the transmission pattern corresponding to the subset of the ABS pattern.

2. The method according to claim 1, further comprising transmitting information about the subset of the ABS pattern to the first pica eNB.

3. The method according to claim 1, further comprising transmitting, to the first pico eNB, an indicator indicating that the transmission pattern used is the same as the ABS pattern.

4. A second pico evolved Node B (eNB), for controlling interference between a plurality of pica eNBs within coverage of a macro eNB in a wireless communication system, the second pico eNB comprising:
a Radio Frequency (RF) unit; and
a processor that controls the RF unit to:
receive, from the macro eNB, information of an Almost Blank Subframe (ABS) pattern used by the macro eNB performing ABS operation; and
receive, from a first pica eNB, a message requesting that the second pico eNB perform an ABS operation using a transmission pattern which is the same as the ABS pattern or a transmission pattern corresponding to a subset of the ABS pattern, the second pico eNB performing the ABS operation using the transmission pattern which is the same as the ABS pattern or the transmission pattern corresponding to the subset of the ABS pattern.

5. The second pico eNB according to claim 4, wherein the processor further controls the RF unit to transmit information about the subset of the ABS pattern to the first pica eNB.

6. The second pica eNB according to claim 4, wherein the processor further controls the RF unit to transmit, to the first pico eNB, an indicator indicating that the transmission pattern used is the same as the ABS pattern.

* * * * *